(No Model.)

P. B. CHARBONEAU.
APPARATUS FOR DISTILLING WATER.

No. 383,704. Patented May 29, 1888.

ATTEST:
W. H. Southworth.
George P. Thomas.

INVENTOR:
Pascal B. Charboneau.
by
James E. Thomas.
Atty.

UNITED STATES PATENT OFFICE.

PASCAL B. CHARBONEAU, OF BAY CITY, ASSIGNOR OF ONE-HALF TO THOMAS H. SMITH, OF EAST SAGINAW, MICHIGAN.

APPARATUS FOR DISTILLING WATER.

SPECIFICATION forming part of Letters Patent No. 383,704, dated May 29, 1888.

Application filed April 28, 1885. Renewed August 1, 1887. Serial No. 245,855. (No model.)

*To all whom it may concern:*

Be it known that I, PASCAL B. CHARBONEAU, a citizen of the United States, residing at Bay City, in the county of Bay and State of Michigan, have invented certain new and useful Improvements in Apparatus for Distilling Water; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

As the vapor arising from the rapid evaporation of water containing in solution animal or mineral matter and in suspension mineral matter is freed from the impurities and foreign matter which remain behind, the water formed by the condensation of the vapor must likewise be free from foreign matter and impurities and rendered by the operation more wholesome and healthful when used in the preparation of food; and the objects of my invention are to provide an apparatus by means of which water to be used for drinking and culinary purposes can be cleansed and purified and freed from all foreign, vegetable, or mineral matter held in solution or suspension herein, and thereby prevent disease and sickness which arise from using impure and unwholesome water.

My invention consists, mainly, in the combination and arrangement of a chamber for evaporating the water in such a manner that the impurities are left behind while the pure water passes off in the form of vapor, and a condensing-chamber arranged for receiving the vapor and condensing the same into water, ready for use, as is hereinafter more fully described and claimed, and illustrated in the accompanying drawings, in which—

Figure 1:
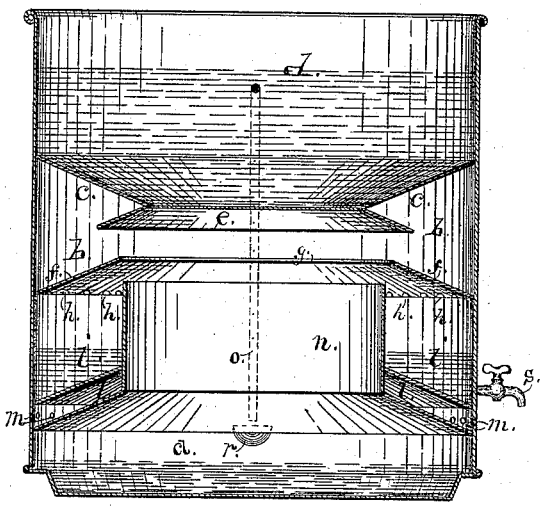
Figure 2:
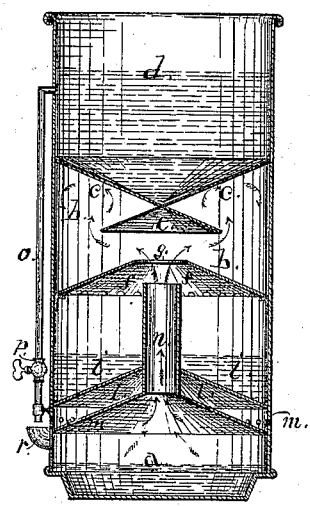

Figure 1 is a longitudinal vertical sectional view of my improved apparatus. Fig. 2 is a transverse vertical section of the same.

Similar letters refer to similar parts throughout the several views.

$a$ represents an evaporating chamber or pan, arranged to rest upon an ordinary stove or over a vapor-burner or other suitable means of heating the water contained therein, and directly above this chamber $a$ is located a second chamber, $b$, which receives the vapor arising from the chamber $a$, and is covered by the division $c$, which extends over the entire surface of the chamber $b$, with its central portion considerably lower than the outside portion thereof, and forms also a bottom for a cold-water reservoir, $d$, the sides of the chamber $b$ extending upward to a suitable distance to form the sides of the reservoir.

Just below the division $c$ is placed a disk or deflecting-plate, $e$, with its central portion secured to the division $c$, and with its outer edges extending nearly to the sides of the chamber and arranged to be considerably lower than the central portion thereof.

At a short distance below the plate $e$ is placed a second deflecting-plate, $f$, extending from the sides of the chamber inward and upward, having a central opening, $g$, the edges of which are somewhat nearer the center of the chamber than the outer edges of the plate $e$, so that water dripping from the plate $e$ will be caught by the plate $f$ and conducted to the sides of the chamber, where openings $h$ are left to allow the water to pass below to a second reservoir, $i$, which is arranged for receiving and retaining the water formed from the condensed vapor.

Just below the reservoir $i$, and over the evaporating-chamber $a$, is arranged an air-chamber, $l$, having openings $m$ through the surrounding sides thereof, and a conducting-pipe, $n$, passed through its central portion and extended to some distance above the upper part of the said chamber, in order that the water received by the reservoir $i$ may not overflow and fall again into the chamber $a$.

Connected at one end with the reservoir $d$, at some distance above the bottom thereof and extending downward to a proper distance, is the conducting-pipe $o$. It is also provided with a valve, $p$, with which to regulate the amount of water which may pass through the pipe, and its lower end is arranged to drip into a projecting spout, $r$, which opens into and extends from the chamber $a$. This spout $r$ is of suitable size to allow water to be poured into the chamber $a$, and the opening between the spout $r$ and chamber $a$ is designed to be usually open above the surface of the water in the chamber $a$ to allow steam to pass out should more vapor be formed by the evaporating-chamber than could be reduced to water by the condensing-chamber, and should the pipe $o$ feed more water to the chamber $a$ than is readily evaporated the water will rise in the chamber until it is visible in the spout $r$, when the flow through the pipe $o$ may be reduced or shut off, as desired.

The reservoir $i$ is provided with a suitable valve, $s$, placed near the bottom of the reservoir $i$ for drawing off the water contained therein from time to time as needed.

To operate the apparatus it is placed upon an ordinary stove or other means of heating and the reservoir $d$ is filled with cold water. The valve $p$ is then opened and the water flows through the pipe $o$ into the chamber $a$. Whenever a sufficient quantity of water has passed into the chamber $a$, the valve $p$ is turned off to allow only a small amount of water to drip from the pipe to replenish the quantity evaporated from the chamber $a$. The vapor arising from the water in the chamber $a$ passes through the pipe $n$ into the chamber $b$ and to the upper portion thereof, where the temperature is cooled by the cold water in the reservoir, and consequently condensation takes place, and the water formed thereby impinges on the inclined cover $c$ and flows thereon to the center, where it is caught on the upper side of the deflecting-plate $e$ and conducted again to the outer edge thereof, and, falling, is caught by the deflecting-plate $f$ and conducted to the outer part of the chamber, where it passes through the openings $h$ into the reservoir $i$, where it will remain until drawn off for use by the valve $s$, the air-chamber $l$ below preventing any direct action from the heat in the chamber below upon the water in the reservoir, as the cool outside air may always circulate freely through the holes $m$.

The deflecting-plates $e$ and $c$ also serve to retard the movement of the arising vapor and to distribute it to different parts of the condensing-chamber and present more surface to receive the water and conduct the same quickly to the reservoir below and leave the plates free to receive a fresh supply. A small quantity of water only is needed in the chamber $a$, and the supply-pipe $o$ is arranged at the bottom by leaving a space between the end of the pipe and the spout $r$, so that the amount of water passing therein may be seen and easily regulated to replenish just the amount evaporated from the chamber $a$.

Having fully described the operation and construction of my invention, what I claim as new, and desire to secure by Letters Patent, is—

1. In a water-distilling apparatus, the combination, with an evaporating-chamber, $a$, a condensing-chamber, $b$, above the said chamber $a$, and a cold-water reservoir, $d$, located above the said chamber $b$, of a spout, $r$, projecting from and opening into the said chamber $a$, and a feed-pipe, $n$, connected with the cold-water reservoir $d$ and leading to the said spout $r$, and provided with a valve, $p$, substantially as and for the purpose specified.

2. In a water-distilling apparatus, the evaporating-chamber $a$, a receiving-chamber, $i$, over the said chamber $a$, a condensing-chamber, $b$, above the said chamber $i$, and a pipe, $n$, passing through the said chamber $i$ and connecting the said chamber $b$ with the chamber $a$, in combination with the conical deflecting-plate $e$, placed directly over the said pipe $n$, and the deflecting-plate $f$, forming the top of the said chamber $i$, and provided with the central opening, $g$, and the outside openings, $h$, substantially as and for the purpose set forth.

3. In a water-purifying apparatus, the combination of an evaporating-chamber, $a$, and a condensing-chamber, $b$, located directly over the said chamber $a$, and the pipe $n$, connecting the said chambers with an air-chamber, $l$, located between the said chambers $a$ and $b$ and provided with the holes $m$ in the sides thereof, substantially as and for the purpose set forth.

In testimony whereof I affix my signature in presence of two witnesses.

PASCAL B. CHARBONEAU.

Witnesses:
J. E. THOMAS,
W. H. SOUTHWORTH.